United States Patent
Gorokhov et al.

(10) Patent No.: US 9,078,146 B2
(45) Date of Patent: Jul. 7, 2015

(54) SECONDARY SYNCHRONIZATION SIGNAL (SSS) POST-PROCESSING TO ELIMINATE SHORT CODE COLLISION INDUCED FALSE CELLS

(71) Applicant: QUALCOMM Incorporated, San Diego, CA (US)

(72) Inventors: Alexei Yurievitch Gorokhov, San Diego, CA (US); Jun Ma, San Diego, CA (US); Kapil Bhattad, Bangalore (IN); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 98 days.

(21) Appl. No.: 14/021,823

(22) Filed: Sep. 9, 2013

(65) Prior Publication Data

US 2014/0071960 A1 Mar. 13, 2014

Related U.S. Application Data

(60) Provisional application No. 61/699,107, filed on Sep. 10, 2012.

(51) Int. Cl.
 *H04W 24/02* (2009.01)
 *H04J 11/00* (2006.01)

(52) U.S. Cl.
 CPC ............ *H04W 24/02* (2013.01); *H04J 11/0076* (2013.01); *H04J 11/005* (2013.01)

(58) Field of Classification Search
 CPC .................................................. H04W 72/0446
 USPC ........................................................ 370/336
 See application file for complete search history.

(56) References Cited

U.S. PATENT DOCUMENTS

| | | | |
|---|---|---|---|
| 7,916,714 B2* | 3/2011 | Han et al. | 370/350 |
| 2004/0203911 A1* | 10/2004 | Masuda et al. | 455/456.1 |
| 2009/0010312 A1* | 1/2009 | Han et al. | 375/145 |
| 2009/0252332 A1 | 10/2009 | Chang et al. | |
| 2010/0135257 A1* | 6/2010 | Higuchi et al. | 370/336 |
| 2011/0007658 A1* | 1/2011 | Lindoff et al. | 370/252 |
| 2011/0103350 A1* | 5/2011 | Lindoff | 370/332 |
| 2012/0046056 A1 | 2/2012 | Luo et al. | |
| 2012/0140862 A1 | 6/2012 | Fine et al. | |
| 2012/0231790 A1 | 9/2012 | Lindoff et al. | |
| 2012/0307820 A1 | 12/2012 | Tomatis et al. | |
| 2014/0140337 A1* | 5/2014 | Seo et al. | 370/350 |
| 2015/0049687 A1* | 2/2015 | Kim et al. | 370/329 |

FOREIGN PATENT DOCUMENTS

WO WO-2012065413 A1 5/2012

OTHER PUBLICATIONS

International Search Report and Written Opinion—PCT/US2013/059043—ISA/EPO—Apr. 3, 2014.
3GPP2 C.P0024-100-C: "Introduction to cdma2000 High Rate Packet Data Air Interface Specification," Version 1.2, Apr. 2011, pp. 64.

* cited by examiner

*Primary Examiner* — Melvin Marcelo
*Assistant Examiner* — Peter Solinsky
(74) *Attorney, Agent, or Firm* — Patterson & Sheridan, L.L.P.

(57) ABSTRACT

Certain aspects of the present disclosure provide techniques for improving detection and processing of secondary synchronization signals (SSS).

26 Claims, 7 Drawing Sheets

500

| $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ |
|---|---|---|---|---|---|---|---|---|---|---|---|---|---|---|---|---|---|
| 0 | 0 | 1 | 34 | 4 | 6 | 68 | 9 | 12 | 102 | 15 | 19 | 136 | 22 | 27 |
| 1 | 1 | 2 | 35 | 5 | 7 | 69 | 10 | 13 | 103 | 16 | 20 | 137 | 23 | 28 |
| 2 | 2 | 3 | 36 | 6 | 8 | 70 | 11 | 14 | 104 | 17 | 21 | 138 | 24 | 29 |
| 3 | 3 | 4 | 37 | 7 | 9 | 71 | 12 | 15 | 105 | 18 | 22 | 139 | 25 | 30 |
| 4 | 4 | 5 | 38 | 8 | 10 | 72 | 13 | 16 | 106 | 19 | 23 | 140 | 0 | 6 |
| 5 | 5 | 6 | 39 | 9 | 11 | 73 | 14 | 17 | 107 | 20 | 24 | 141 | 1 | 7 |
| 6 | 6 | 7 | 40 | 10 | 12 | 74 | 15 | 18 | 108 | 21 | 25 | 142 | 2 | 8 |
| 7 | 7 | 8 | 41 | 11 | 13 | 75 | 16 | 19 | 109 | 22 | 26 | 143 | 3 | 9 |
| 8 | 8 | 9 | 42 | 12 | 14 | 76 | 17 | 20 | 110 | 23 | 27 | 144 | 4 | 10 |
| 9 | 9 | 10 | 43 | 13 | 15 | 77 | 18 | 21 | 111 | 24 | 28 | 145 | 5 | 11 |
| 10 | 10 | 11 | 44 | 14 | 16 | 78 | 19 | 22 | 112 | 25 | 29 | 146 | 6 | 12 |
| 11 | 11 | 12 | 45 | 15 | 17 | 79 | 20 | 23 | 113 | 26 | 30 | 147 | 7 | 13 |
| 12 | 12 | 13 | 46 | 16 | 18 | 80 | 21 | 24 | 114 | 0 | 5 | 148 | 8 | 14 |
| 13 | 13 | 14 | 47 | 17 | 19 | 81 | 22 | 25 | 115 | 1 | 6 | 149 | 9 | 15 |
| 14 | 14 | 15 | 48 | 18 | 20 | 82 | 23 | 26 | 116 | 2 | 7 | 150 | 10 | 16 |
| 15 | 15 | 16 | 49 | 19 | 21 | 83 | 24 | 27 | 117 | 3 | 8 | 151 | 11 | 17 |
| 16 | 16 | 17 | 50 | 20 | 22 | 84 | 25 | 28 | 118 | 4 | 9 | 152 | 12 | 18 |
| 17 | 17 | 18 | 51 | 21 | 23 | 85 | 26 | 29 | 119 | 5 | 10 | 153 | 13 | 19 |
| 18 | 18 | 19 | 52 | 22 | 24 | 86 | 27 | 30 | 120 | 6 | 11 | 154 | 14 | 20 |
| 19 | 19 | 20 | 53 | 23 | 25 | 87 | 0 | 4 | 121 | 7 | 12 | 155 | 15 | 21 |
| 20 | 20 | 21 | 54 | 24 | 26 | 88 | 1 | 5 | 122 | 8 | 13 | 156 | 16 | 22 |
| 21 | 21 | 22 | 55 | 25 | 27 | 89 | 2 | 6 | 123 | 9 | 14 | 157 | 17 | 23 |
| 22 | 22 | 23 | 56 | 26 | 28 | 90 | 3 | 7 | 124 | 10 | 15 | 158 | 18 | 24 |
| 23 | 23 | 24 | 57 | 27 | 29 | 91 | 4 | 8 | 125 | 11 | 16 | 159 | 19 | 25 |
| 24 | 24 | 25 | 58 | 28 | 30 | 92 | 5 | 9 | 126 | 12 | 17 | 160 | 20 | 26 |
| 25 | 25 | 26 | 59 | 0 | 3 | 93 | 6 | 10 | 127 | 13 | 18 | 161 | 21 | 27 |
| 26 | 26 | 27 | 60 | 1 | 4 | 94 | 7 | 11 | 128 | 14 | 19 | 162 | 22 | 28 |
| 27 | 27 | 28 | 61 | 2 | 5 | 95 | 8 | 12 | 129 | 15 | 20 | 163 | 23 | 29 |
| 28 | 28 | 29 | 62 | 3 | 6 | 96 | 9 | 13 | 130 | 16 | 21 | 164 | 24 | 30 |
| 29 | 29 | 30 | 63 | 4 | 7 | 97 | 10 | 14 | 131 | 17 | 22 | 165 | 0 | 7 |
| 30 | 0 | 2 | 64 | 5 | 8 | 98 | 11 | 15 | 132 | 18 | 23 | 166 | 1 | 8 |
| 31 | 1 | 3 | 65 | 6 | 9 | 99 | 12 | 16 | 133 | 19 | 24 | 167 | 2 | 9 |
| 32 | 2 | 4 | 66 | 7 | 10 | 100 | 13 | 17 | 134 | 20 | 25 | - | - | - |
| 33 | 3 | 5 | 67 | 8 | 11 | 101 | 14 | 18 | 135 | 21 | 26 | - | - | - |

FIG. 5

SECONDARY SYNCHRONIZATION SIGNAL (SSS) POST-PROCESSING TO ELIMINATE SHORT CODE COLLISION INDUCED FALSE CELLS

CROSS-REFERENCE TO RELATED APPLICATION(S)

This application claims the benefit of U.S. Provisional Application Ser. No. 61/699,107, filed on Sep. 10, 2012, which is assigned to the assignee of the present application and hereby expressly incorporated by reference herein in its entirety.

BACKGROUND

I. Field

The present disclosure relates generally to detection using secondary synchronization signals (SSS), and more specifically to techniques for choosing a secondary synchronization signal from amongst several candidate signals when there is short-code collision.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

Various reference signals (RSs), known to the UEs, may be transmitted in the downlink, for example, to facilitate channel estimation. In some cases, cell-specific RSs are provided, which are common to all UEs in a cell. In addition, UE-specific RSs may also be transmitted, embedded in data targeting specific UEs. Further, Multimedia Broadcast Single Frequency Network (MBSFN)-specific RSs may also be provided in case of MBSFN configurations. These RSs typically occupy specified Resource Elements (REs) within an Orthogonal Frequency Division Multiplexed (OFDM) symbol.

SUMMARY

Certain aspects of the present disclosure provide a method for detecting a secondary synchronization signal (SSS) transmitted from a base station. The method generally includes obtaining samples of a received signal across one or more reference pilot intervals, processing the samples to detect a plurality of SSS candidates, each SSS candidate having a corresponding first short code and second short code and the processing comprising computing a combined energy metric for each SSS candidate based on the first and second short codes, computing, for each SSS candidate, a first energy metric for the first short code and a second energy metric for the second short code, and selecting one of the SSS candidates based on evaluation of the corresponding first and second energy metrics, wherein the selecting comprises identifying SSS candidates that share a first short code or second short code with another SSS candidate and eliminating identified SSS candidates based on evaluation of the corresponding first and second energy metrics.

Certain aspects of the present disclosure provide an apparatus for detecting a secondary synchronization signal (SSS) transmitted from a base station. The apparatus generally includes means for obtaining samples of a received signal across one or more reference pilot intervals, means for processing the samples to detect a plurality of SSS candidates, each SSS candidate having a corresponding first short code and second short code and the means for processing comprising means for computing a combined energy metric for each SSS candidate based on the first and second short codes, means for computing, for each SSS candidate, a first energy metric for the first short code and a second energy metric for the second short code, and means for selecting one of the SSS candidates based on evaluation of the corresponding first and second energy metrics, wherein the selecting comprises identifying SSS candidates that share a first short code or second short code with another SSS candidate and eliminating identified SSS candidates based on evaluation of the corresponding first and second energy metrics.

Certain aspects of the present disclosure provide an apparatus for detecting a secondary synchronization signal (SSS) transmitted from a base station. The apparatus generally includes at least one processor configured to obtain samples of a received signal across one or more reference pilot intervals, process the samples to detect a plurality of SSS candidates, each SSS candidate having a corresponding first short code and second short code and the processing comprising computing a combined energy metric for each SSS candidate based on the first and second short codes, to compute, for each SSS candidate, a first energy metric for the first short code and a second energy metric for the second short code, and to select one of the SSS candidates based on evaluation of the corresponding first and second energy metrics; and a memory coupled with the at least one processor, wherein the selecting comprises identifying SSS candidates that share a first short code or second short code with another SSS candidate and eliminating identified SSS candidates based on evaluation of the corresponding first and second energy metrics.

Certain aspects of the present disclosure provide a computer program product for detecting a secondary synchronization signal (SSS) transmitted from a base station, comprising a computer-readable medium having instructions stored thereon, the instructions executable by one or more processors for obtaining samples of a received signal across one or more reference pilot intervals, processing the samples to detect a plurality of SSS candidates, each SSS candidate having a corresponding first short code and second short code and the processing comprising computing a combined energy metric for each SSS candidate based on the first and second short codes, computing, for each SSS candidate, a first energy metric for the first short code and a second energy metric for the second short code, and selecting one of the SSS candidates based on evaluation of the corresponding first and second energy metrics, wherein the selecting comprises identifying SSS candidates that share a first short code or second short code with another SSS candidate and eliminating identified SSS candidates based on evaluation of the corresponding first and second energy metrics.

Certain aspects of the present disclosure provide a method for detecting a secondary synchronization signal (SSS) transmitted from a base station. The method generally includes obtaining samples of a received signal across one or more reference pilot intervals, processing the samples to detect a plurality of SSS candidates, each SSS candidate having a corresponding first short code and second short code and the processing comprising computing a combined energy metric for each SSS candidate based on the first and second short codes, computing, for each SSS candidate, a first energy metric for the first short code and a second energy metric for the second short code, generating channel estimates for at least one of the first short code or the second short code, and using the channel estimates to perform interference cancellation for the first and second short codes.

Certain aspects of the present disclosure provide an apparatus for detecting a secondary synchronization signal (SSS) transmitted from a base station. The apparatus generally includes means for obtaining samples of a received signal across one or more reference pilot intervals, means for processing the samples to detect a plurality of SSS candidates, each SSS candidate having a corresponding first short code and second short code and the means for processing comprising means for computing a combined energy metric for each SSS candidate based on the first and second short codes, means for computing, for each SSS candidate, a first energy metric for the first short code and a second energy metric for the second short code, means for generating channel estimates for at least one of the first short code or the second short code, and means for using the channel estimates to perform interference cancellation for the first and second short codes.

Certain aspects of the present disclosure provide an apparatus for detecting a secondary synchronization signal (SSS) transmitted from a base station. The apparatus generally includes at least one processor configured to obtain samples of a received signal across one or more reference pilot intervals, process the samples to detect a plurality of SSS candidates, each SSS candidate having a corresponding first short code and second short code and the processing comprising computing a combined energy metric for each SSS candidate based on the first and second short codes, to compute, for each SSS candidate, a first energy metric for the first short code and a second energy metric for the second short code, generate channel estimates for at least one of the first short code or the second short code, and use the channel estimates to perform interference cancellation for the first and second short codes.

Certain aspects of the present disclosure provide a computer program product for detecting a secondary synchronization signal (SSS) transmitted from a base station, comprising a computer-readable medium having instructions stored thereon, the instructions executable by one or more processors for obtaining samples of a received signal across one or more reference pilot intervals, processing the samples to detect a plurality of SSS candidates, each SSS candidate having a corresponding first short code and second short code and the processing comprising computing a combined energy metric for each SSS candidate based on the first and second short codes, computing, for each SSS candidate, a first energy metric for the first short code and a second energy metric for the second short code, generating channel estimates for at least one of the first short code or the second short code, and using the channel estimates to perform interference cancellation for the first and second short codes.

BRIEF DESCRIPTION OF THE DRAWINGS

FIG. 5 shows an example base station and UE which may operate in accordance with aspects of the present disclosure.

DETAILED DESCRIPTION

Certain aspects of the present disclosure provide techniques for improving detection and processing of secondary synchronization signals (SSS) which each comprise a first short code and a second short code. According to certain aspects, a user equipment may identify multiple SSS candidates and select between the candidates by using an algorithm involving not only full correlation metrics for the combined codes, but separate correlation values for the short codes.

In some cases, a UE may compute, for each SSS candidate, a first energy metric for the first short code and a second energy metric for the second short code and select one of the SSS candidates based on evaluation of both the corresponding first and second energy metrics. This approach may help address short code collisions, for example, by identifying SSS candidates that share a first short code or second short code with another SSS candidate and eliminating identified SSS candidates based on evaluation of the corresponding first and second energy metrics.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
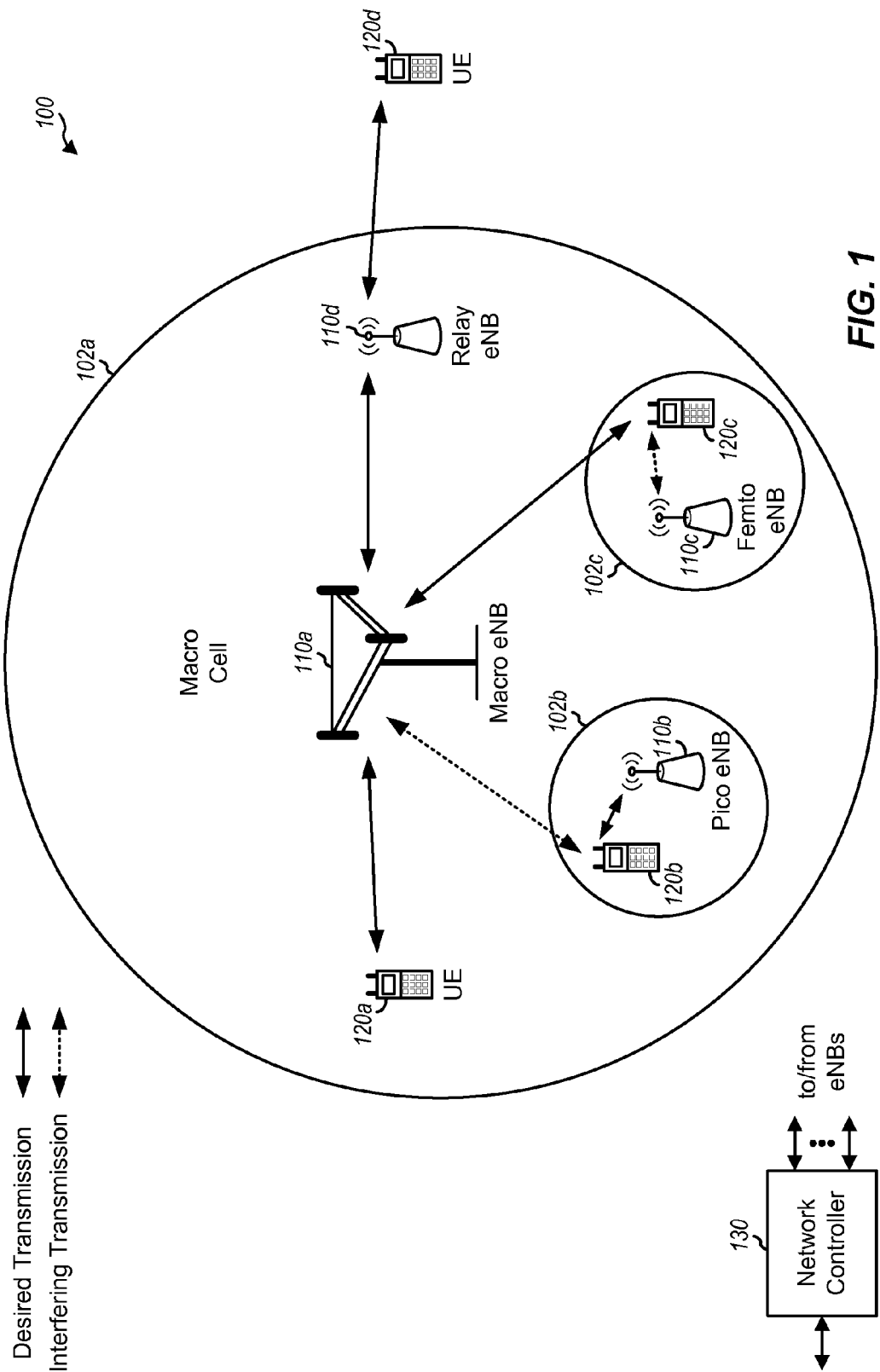
FIG. 1 shows an example wireless communication network, in which aspects of the present disclosure may be practiced.

FIG. 1 shows a wireless communication network 100, which may be an LTE network or some other wireless network. Wireless network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Figure 2:
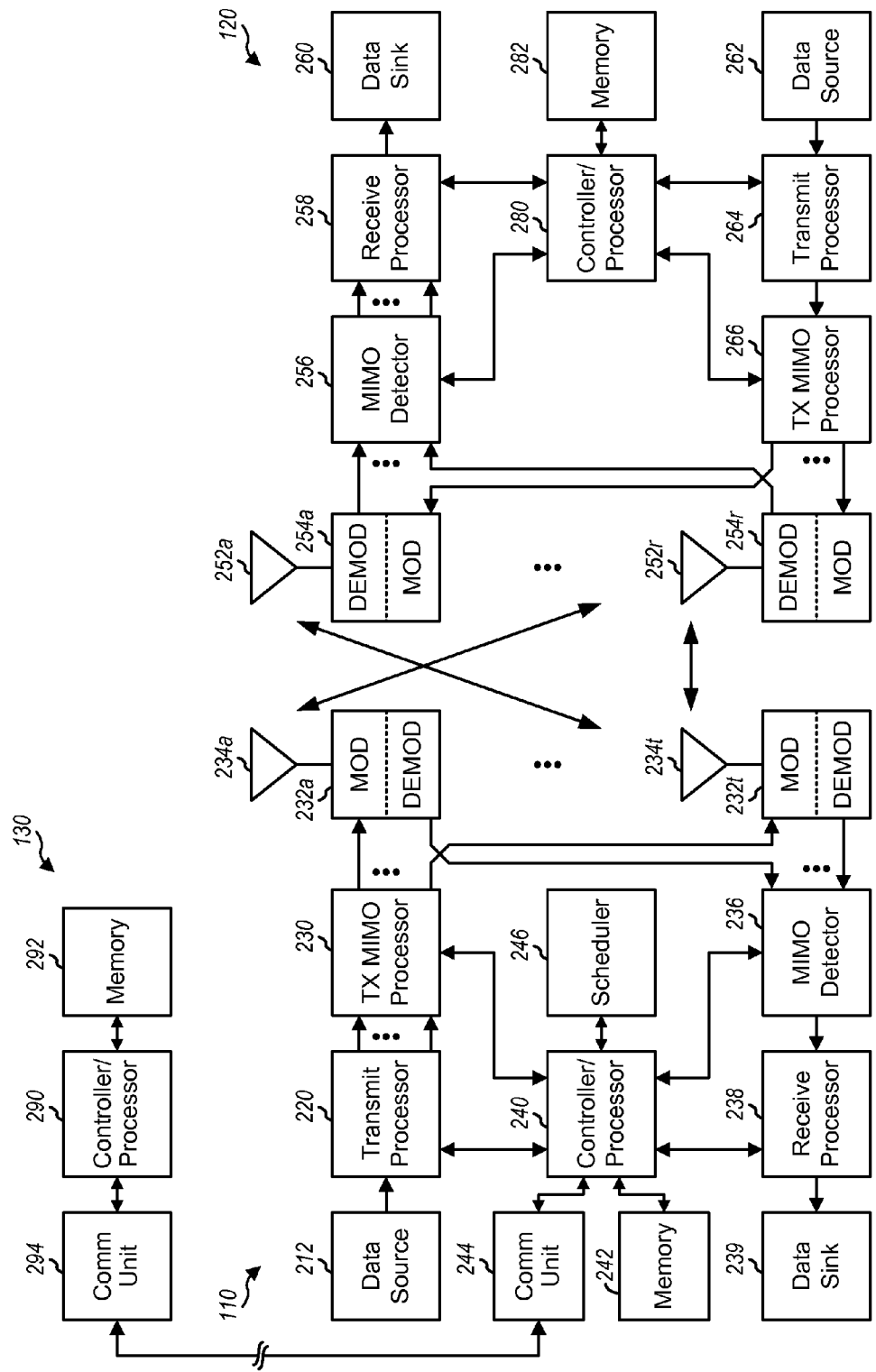
FIG. 2 shows a block diagram of a base station and a user equipment (UE) which may operate in accordance with aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. In accordance with certain aspects of the present disclosure, controller/processor 280 may be configured to perform operations described herein. A channel processor 284 may determine RSRP, RSSI, RSRQ, CQI, etc., as described below.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240.

Controllers/processors 240 and 280 may direct the operation at base station 110 and UE 120, respectively. Processor 280 and/or other processors and modules at UE 120 may perform or direct operations 600 of FIG. 6, and/or other processes for the techniques described herein. Memories 242 and 282 may store data and program codes for base station 110 and UE 120, respectively. A scheduler 244 may schedule UEs for data transmission on the downlink and/or uplink.

Figure 3:
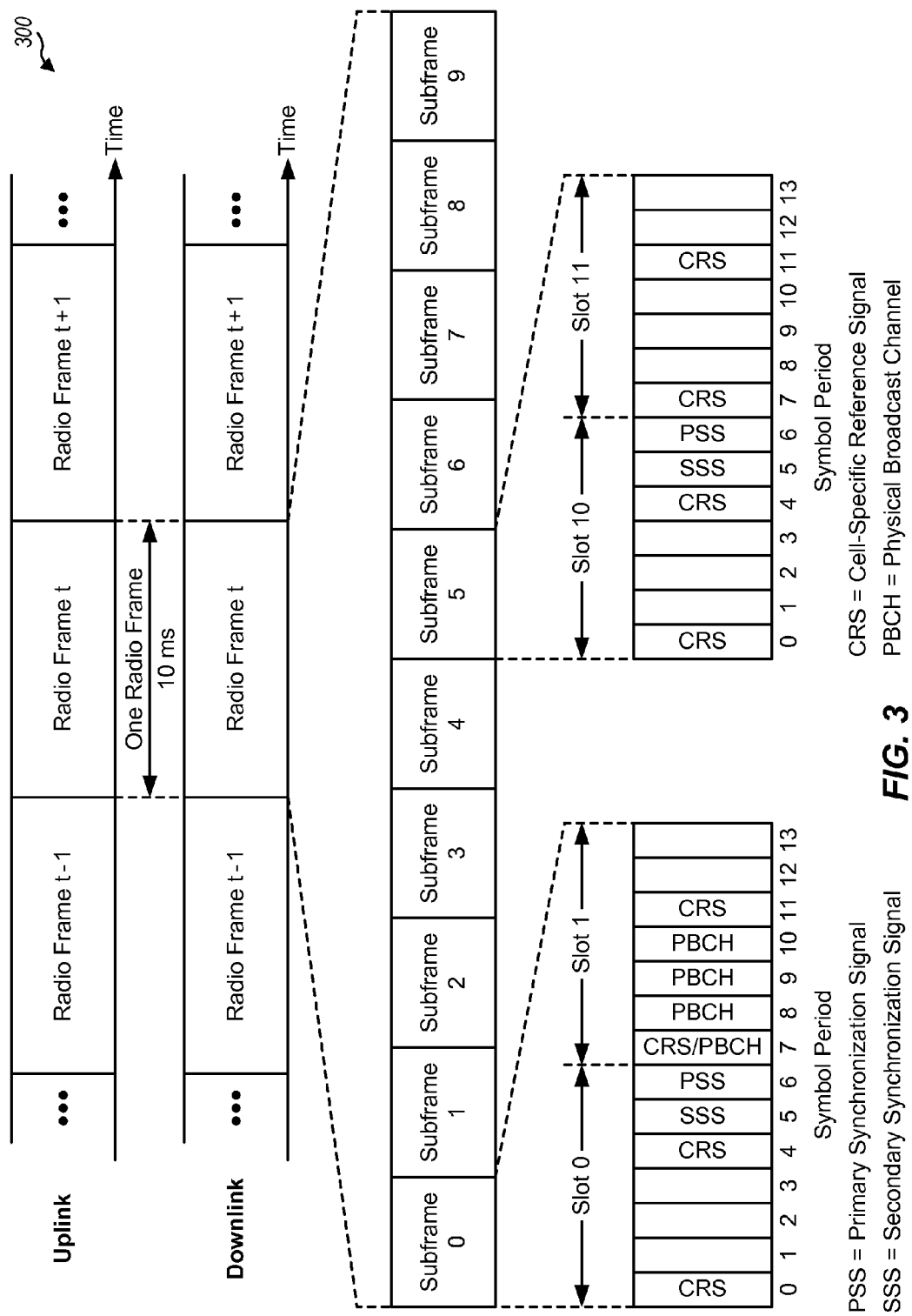
FIG. 3 shows an example frame structure for frequency division duplexing (FDD).

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a PSS and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB.

The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

Figure 4:
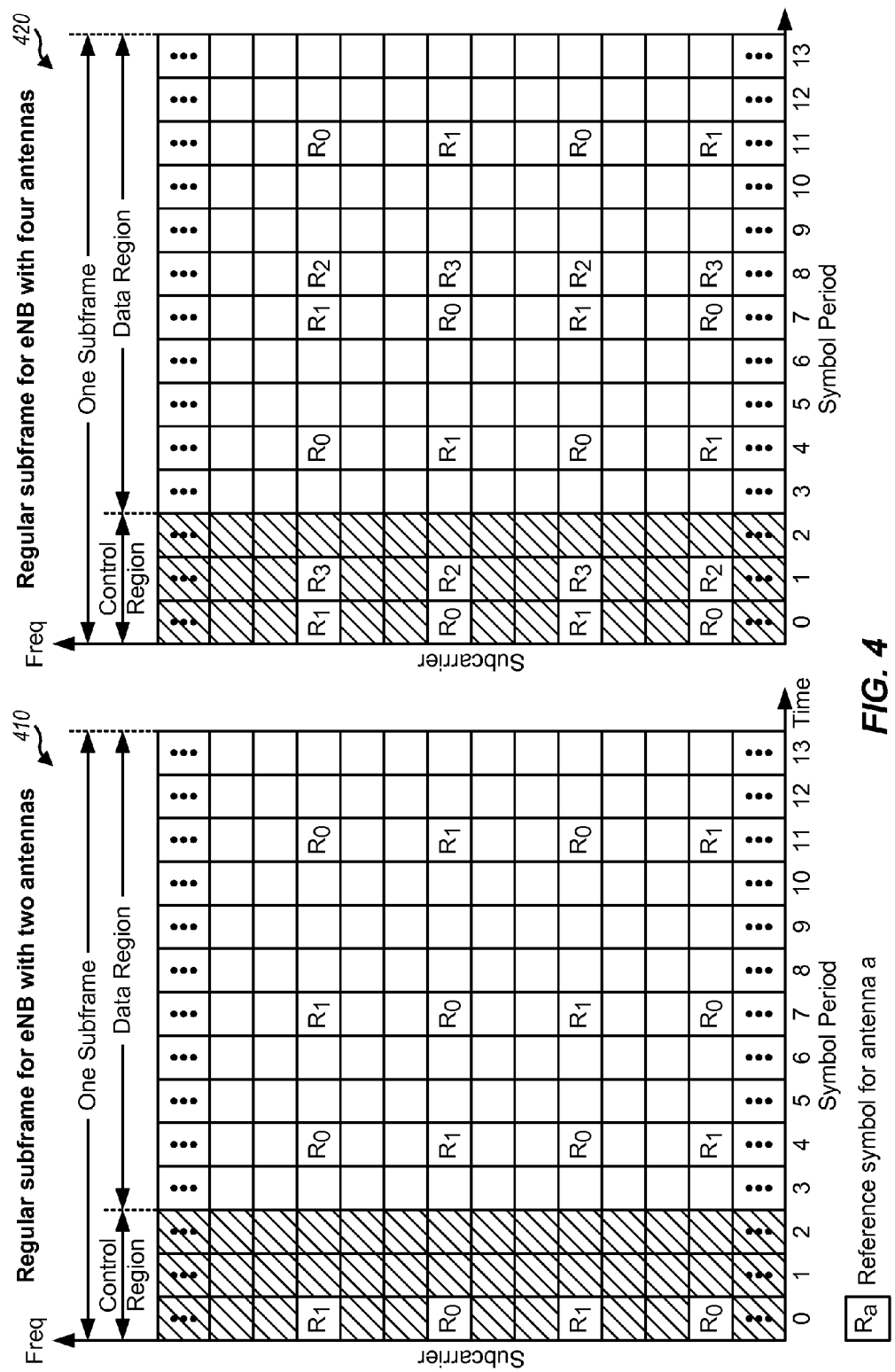
FIG. 4 shows two example subframe formats for the downlink.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q , q+2Q , etc., where $q \in \{0, \ldots Q-1\}$.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

PSS/SSS Signaling For Neighbor Detection

In LTE, Synch signals (PSS/SSS) are used by UEs to identify cell IDs of base stations (eNodeBs) in their vicinity. A typical identification operation involves first detecting PSS to get rough timing and then performing SSS detection, using the detected PSS timing. In some cases, such as in synchronous networks utilizing PSS/SSS interference cancellation (IC), SSS detection may be performed for all PSS hypothesis and for several timing hypothesis.

During neighbor search and at initial acquisition, SSS sequence detection typically involves correlating all possible SSS sequences with the received signal and identifying the cells with the top correlation values. SSS sequences comprise two short codes of length 31 each: Short code 1 is common for several cell IDs that also have the same PSS, while Short code 2 is expected to be different for all the neighbor cell IDs and is expected to have small cross correlations.

The top detected cells after the correlation often tend to be the strongest cell followed by other cell IDs that share the same short code 1 (referred to herein as a "short-code collision") as the strongest cell, which may create problems. For example, this code collision may push genuine neighbors of the UE lower in the list.

This may be illustrated by considering a case where only one cell is in the neighborhood of a UE. For the SSS sequence corresponding to the strongest cell (the actual true cell), the correlation values with short code 1 and short code 2 are expected to be very large since they are both actually transmitted. For cells sharing the same short code 1 as the strongest cell, the correlation value of short code 1 is very large, but correlation value with short code 2 should be small, since the short code 2 (which is different from that of the true cell) is not actually transmitted. For other cell IDs, the correlation values with short code 1 and short code 2 are also likely to be small since they are not transmitted. Hence, the true cell and the cell ID sharing the same short code 1 as the true cell have much larger correlation values than other cells.

As described above, in a conventional approach, the neighbor search list is identified based on the full correlation of the SSS sequence (e.g., the correlation value of short code 1 plus the correlation value of short code 2).

Aspects of the present disclosure, however, provide algorithms that may utilize the correlation values of the individual short codes to make this determination as an alternative or in addition to the full correlation. The proposed algorithms may thus help eliminate fake cells that appear due to code collisions (e.g., because they share the same short code 1 as the strongest cells).

In some cases, a UE may utilize an efficient SSS correlation computation block that computes the correlations for the short code individually. One specific approach to detect based on individual codes is that when the correlation value of short code 1 is significantly larger than the correlation value of short code 2 (say a factor K above) then the correlation metric used for that cell ID could be twice the correlation of short code 2 (e.g., instead of a sum of the correlation values for short code 1 and short code 2), which may avoid a false detection due to the code collision. Additional algorithms are discussed below.

Example SSS Post-Processing to Eliminate Short Code Collision Induced False Cells As noted above, techniques presented herein may help eliminate or reduce errors in SSS detection ("false cell" detection) due to short code collisions. As used herein, the term short code collision generally refers to the case where different base stations transmit different SSS sequences that share a short code (e.g., each SSS uses either the same $m_0$ or $m_1$ code).

By definition, a 62-bit SSS sequence is constructed by interleaving two so-called short codes (typically designated as $m_0$ or $m_1$), each of length 31. An inherent issue is that multiple SSS sequences share the same short code, which can be seen from table 500 shown in FIG. 5.

Table 500 depicting multiple SSS sequences in accordance with the present disclosure. Different SSS sequences may be assigned to different base stations in a wireless network, and is composed of two component short codes. In FIG. 5, the column $N_{ID}^{(1)}$ lists the SSS sequence indexes (when referring to a short code $N_{ID}^{(1)}$ will refer to one of 168 possible sequence indices), while, for each SSS sequence index, $m_0$ and $m_1$ represent the indices of the first and second component short code, respectively. For example, the SSS sequence with $N_{ID}^{(1)}=0$ shares the same short code $m_0=0$ with several SSS sequences. Specifically these sequences that share the same short code are $N_{ID}^{(1)}=30,59,87,114,140$, and 165.

There are also cases in which SSS sequences between two half-frame hypotheses may share a short code. As a result, if SSS detection is performed solely based on energy metrics computed from the entire sequence, many false cells may be incorrectly identified as a result of those false cells sharing a short code sequence with a strong cell. As described above, this problem is what is referred to above as "short-code collision."

In order to mitigate this short-code collision effect, rather than rely solely on combined energy metric, techniques presented herein may utilize different energy metrics for each SSS index hypothesis.

Figure 6:
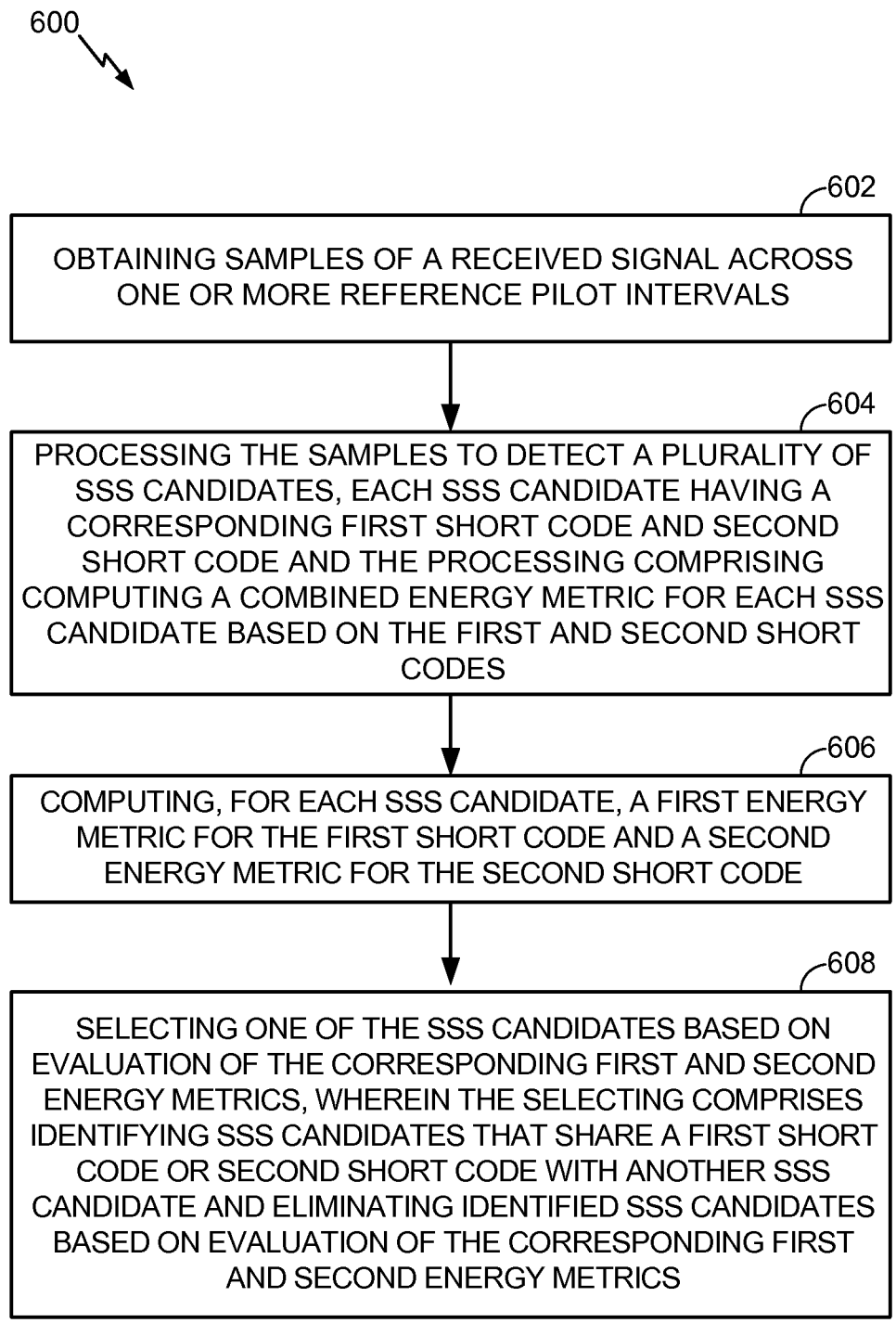
FIG. 6 illustrates example operations that may be performed by a UE, in accordance with certain aspects of the present disclosure.

FIG. 6 illustrates example operations 600 that may be performed for detecting a secondary synchronization signal (SSS) transmitted from a base station. The operations 600 may be performed, for example, by a UE.

The operations 600 begin, at 602, by obtaining samples of a received signal across one or more reference pilot intervals. At 604, the UE processes samples to detect a plurality of SSS candidates, each SSS candidate having a corresponding first short code and second short code and the processing comprising computing a combined energy metric for each SSS candidate based on the first and second short codes. At 606, the UE computes, for each SSS candidate, a first energy metric for the first short code and a second energy metric for the second short code.

At 608, the UE selects one of the SSS candidates based on evaluation of the corresponding first and second energy metrics. As will be described in greater detail below, according to certain aspects, the selecting may involve identifying SSS candidates that share a first short code or second short code with another SSS candidate and eliminating identified SSS candidates based on evaluation of the corresponding first and second energy metrics.

One example algorithm may utilize the combined metric $E_0(N_{ID}^{(1)})$, a metric $E_1(N_{ID}^{(1)})$, based on short code 1 and a metric $E_2(N_{ID}^{(1)})$, based on short code 2. The techniques may take advantage of the fact that, for a valid cell detection, the energy metric for individual codes should be of similar strength (e.g., for a valid SSS, both short codes are interleaved to form the SSS are transmitted from the same base station).

Based on this information, according to certain aspects, SSS candidates (or hypotheses) may be pruned (removed from consideration) that have an associated $E_1(N_{ID}^{(1)})$ or $E_2(N_{ID}^{(1)})$ which is below a threshold μ'. Surviving SSS candidates, on the other hand, may be sorted (e.g., in a non-increasing order) according to the combined metric $E_0(N_{ID}^{(1)})$. Exactly how such pruning is performed may vary for different implementations.

In some cases, after initial processing of received samples, a record may be created for each SSS candidate and the records may be sorted (e.g., based on the combined energy metric). Subsequently, the sorted records may be reviewed and "visited code lists" for short codes 1 and 2 ($m_0$ and $m_1$) for the records accepted based on comparison of metric value with another threshold μ'.

During an iterative process, whenever a record has an SSS index corresponding to short codes that are not yet on a "visited code list", a combined metric may be used for a decision of whether or not to keep that candidate. However, if one of the short codes appears on the list (meaning it shares a short code with another SSS candidate), a metric based on the alternate short code (e.g., the one that is not shared) may be compared to the same threshold μ' used to make a decision.

It may be recalled that for a valid code, the energy metrics for both codes should be the same or close (and also be the same or close to the normalized combined energy metric). Thus, in the event of threshold crossing (energy above a threshold), the record is added to an accepted record list while the corresponding short codes 1, 2 are added to the corresponding visited code lists. The described operations may be described by the following algorithmic steps.

As an initial step, the UE may initialize the two visited code lists associated with short code 1 and 2 to empty lists. As a subsequent step, the UE may populate the list with records corresponding to different SSS hypotheses.

For every record corresponding to a SSS hypothesis, the UE may first find short codes 1 and 2 associated with SSS index $N_{ID}^{(1)}$. If none of the short codes appear on the respective visited code lists then set:

$$E(N_{ID}^{(1)}):=E_0(N_{ID}^{(1)})$$

else if short code 2 appears on the respective visited code list then set:

$$E(N_{ID}^{(1)}):=E_1(N_{ID}^{(1)})$$

else set:

$$E(N_{ID}^{(1)}):=E_2(N_{ID}^{(1)}).$$

If $E(N_{ID}^{(1)}) > \mu^1$ then the UE may add the current record to the accepted record list with a single energy metric set to $E(N_{ID}^{(1)}, \mu)$ and add the corresponding short codes 1, 2 to the respective visited code lists. Otherwise, the UE may discard this SSS hypothesis.

The procedures mentioned above may be applied to SSS hypotheses corresponding to each PSS, CP and frame boundary hypothesis. In other words, the techniques may be applied for each such detection.

Figure 7:
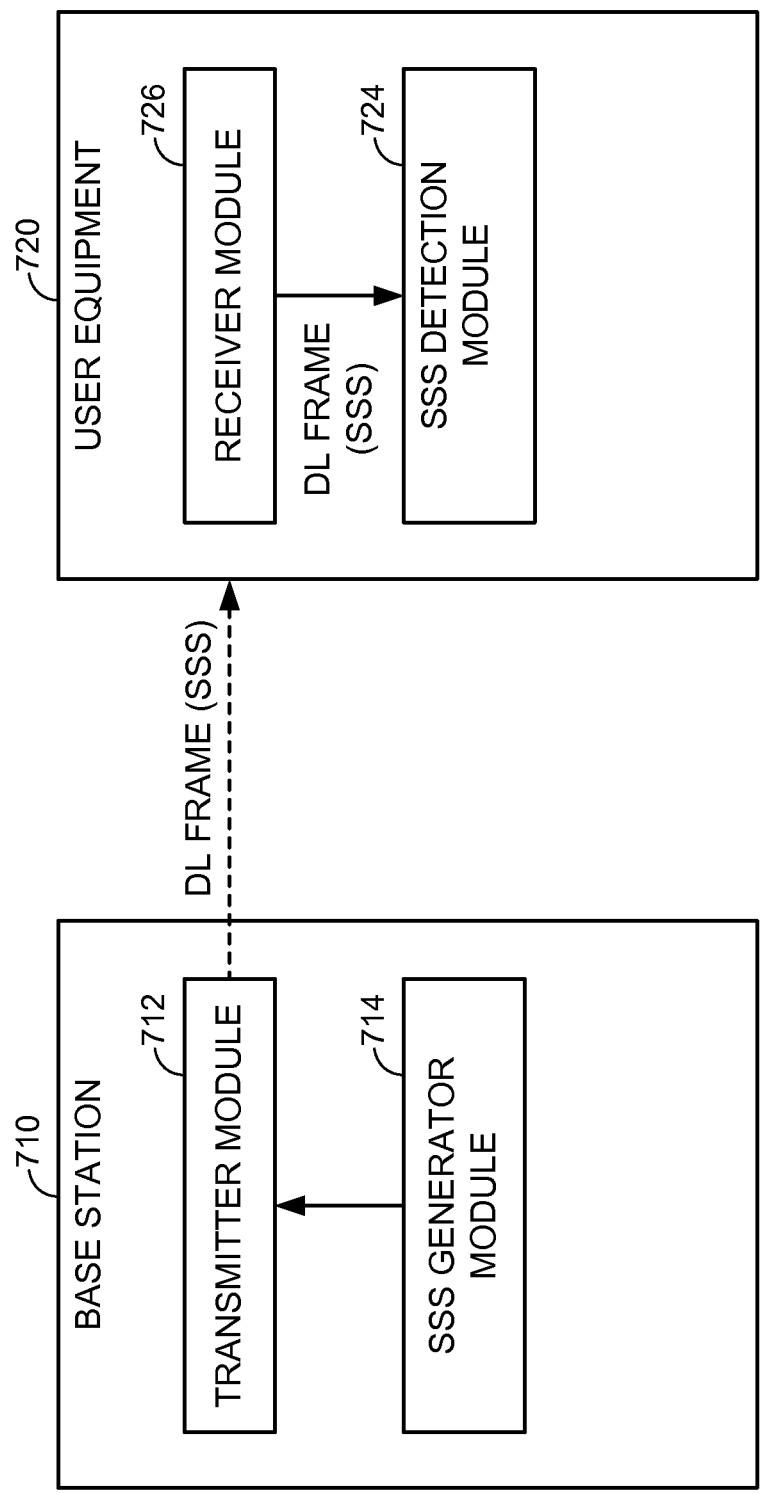
FIG. 7 is a table showing example secondary synchronization signal (SSS) indices and the corresponding first and second short code sequence, demonstrating possible short code collisions that may be addressed in accordance with aspects of the present disclosure.

FIG. 7 illustrates an example system with a base station (BS) 710 and UE 720 that may be configured to perform detection in accordance with aspects of the present disclosure. As illustrated, the BS 710 may include an SSS generator module 714 to generate an SSS sequence (e.g., based on short code combinations shown in the table of FIG. 5) and transmit the SSS sequence in a DL subframe, via a transmitter module 712.

The UE 720 may receive signals transmitted in the DL subframe, via a receiver module 726, and process the signals with an SSS detection module 724. The SSS detection module 724 may perform detection utilizing algorithms described above, for example, by identifying multiple SSS candidates and select between the candidates by using an algorithm involving not only full correlation metrics for the combined codes, but separate correlation values for the short codes.

In some cases, further processing may be performed using results of the SSS decoding candidate processing described above. For example, SSS interference cancellation (IC) may be performed based on a channel estimated from short code 2. In some cases, this may come at a cost of reduced channel estimation accuracy when compared with channel estimate obtained using both short code 1 and short code 2. However, such an approach may give more accurate channel estimates when two cells sharing a the same short code 1 are present. In any case, a portion of the SSS signal may be used for channel estimation and that channel estimate may be subsequently used for interference cancellation. Such cancellation may be performed independently for different portions of the SSS signal. For example, interference cancellation may be performed independently for short code 1 and short code 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for detecting a secondary synchronization signal (SSS) transmitted from a base station, comprising:
   obtaining samples of a received signal across one or more reference pilot intervals;
   processing the samples to detect a plurality of SSS candidates, each SSS candidate having a corresponding first short code and second short code and the processing comprising computing a combined energy metric for each SSS candidate based on the first and second short codes;
   computing, for each SSS candidate, a first energy metric for the first short code and a second energy metric for the second short code; and
   selecting one of the SSS candidates based on evaluation of the corresponding first and second energy metrics, wherein the selecting comprises identifying SSS candidates that share a first short code or second short code with another SSS candidate and eliminating identified SSS candidates based on evaluation of the corresponding first and second energy metrics.

2. The method of claim 1, further comprising:
   creating a record for each SSS candidate; and
   storing, for each record, the corresponding combined energy metric, first energy metric, and secondary energy metric.

3. The method of claim 2, further comprising:
   sorting the records based on combined energy metrics;
   identifying a record that shares a common short code with another record; and
   examining the energy metric for the other short code not shared with the other record.

4. The method of claim 3, further comprising:
   eliminating an SSS candidate for the identified record if the examined energy metric is below a threshold value.

5. The method of claim 4, wherein the selecting comprises selecting an SSS candidate that was not eliminated.

6. A method for processing a secondary synchronization signal (SSS) transmitted from a base station, comprising:
   obtaining samples of a received signal across one or more reference pilot intervals;
   processing the samples to detect a plurality of SSS candidates, each SSS candidate having a corresponding first short code and second short code and the processing comprising computing a combined energy metric for each SSS candidate based on the first and second short codes;
   computing, for each SSS candidate, a first energy metric for the first short code and a second energy metric for the second short code;
   generating channel estimates for at least one of the first short code or the second short code; and
   using the channel estimates to perform interference cancellation for the first and second short codes.

7. The method of claim 6, wherein:
   the channel estimate for the first short code is used to perform interference cancellation of the first short code; and
   the channel estimate for the second short code is used to perform interference cancellation of second short code.

8. The method of claim 6, wherein the channel estimate for the second short code is used to perform interference cancellation of both the first short code and the second short code.

9. An apparatus for detecting a secondary synchronization signal (SSS) transmitted from a base station, comprising:
   a receiver configured to obtain samples of a received signal across one or more reference pilot intervals; and
   at least one processor configured to process the samples to detect a plurality of SSS candidates, each SSS candidate having a corresponding first short code and second short code and the processing comprising computing a combined energy metric for each SSS candidate based on the first and second short codes, compute, for each SSS candidate, a first energy metric for the first short code and a second energy metric for the second short code, and select one of the SSS candidates based on evaluation of the corresponding first and second energy metrics, wherein the selecting comprises identifying SSS candidates that share a first short code or second short code with another SSS candidate and eliminating identified SSS candidates based on evaluation of the corresponding first and second energy metrics.

10. The apparatus of claim 9, wherein the processor is further configured to:
    create a record for each SSS candidate; and
    store, for each record, the corresponding combined energy metric, first energy metric, and secondary energy metric.

11. The apparatus of claim 10, wherein the processor is further configured to:
    sort the records based on combined energy metrics;
    identify a record that shares a common short code with another record; and
    examine the energy metric for the other short code not shared with the other record.

12. The apparatus of claim 11, wherein the processor is further configured to:
    eliminate an SSS candidate for the identified record if the examined energy metric is below a threshold value.

13. The apparatus of claim 12, wherein the processor is configured to select an SSS candidate that was not eliminated.

14. An apparatus for detecting a secondary synchronization signal (SSS) transmitted from a base station, comprising:
    a receiver configured to obtain samples of a received signal across one or more reference pilot intervals; and
    at least one processor configured to process the samples to detect a plurality of SSS candidates, each SSS candidate having a corresponding first short code and second short code and the processing comprising computing a combined energy metric for each SSS candidate based on the first and second short codes, compute, for each SSS candidate, a first energy metric for the first short code and a second energy metric for the second short code, generate channel estimates for at least one of the first short code or the second short code, and use the channel estimates to perform interference cancellation for the first and second short codes.

15. The apparatus of claim 14, wherein:
the channel estimate for the first short code is used to perform interference cancellation of the first short code; and
the channel estimate for the second short code is used to perform interference cancellation of second short code.

16. The apparatus of claim 14, wherein the channel estimate for the second short code is used to perform interference cancellation of both the first short code and the second short code.

17. An apparatus for detecting a secondary synchronization signal (SSS) transmitted from a base station, comprising:
means for obtaining samples of a received signal across one or more reference pilot intervals;
means for processing the samples to detect a plurality of SSS candidates, each SSS candidate having a corresponding first short code and second short code and the processing comprising computing a combined energy metric for each SSS candidate based on the first and second short codes;
means for computing, for each SSS candidate, a first energy metric for the first short code and a second energy metric for the second short code; and
means for selecting one of the SSS candidates based on evaluation of the corresponding first and second energy metrics, wherein the selecting comprises identifying SSS candidates that share a first short code or second short code with another SSS candidate and eliminating identified SSS candidates based on evaluation of the corresponding first and second energy metrics.

18. The apparatus of claim 17, further comprising:
means for creating a record for each SSS candidate; and
means for storing, for each record, the corresponding combined energy metric, first energy metric, and secondary energy metric.

19. The apparatus of claim 18, further comprising:
means for sorting the records based on combined energy metrics;
means for identifying a record that shares a common short code with another record; and
means for examining the energy metric for the other short code not shared with the other record.

20. The apparatus of claim 19, further comprising:
means for eliminating an SSS candidate for the identified record if the examined energy metric is below a threshold value.

21. The apparatus of claim 20, wherein the means for selecting comprises means for selecting an SSS candidate that was not eliminated.

22. An apparatus for detecting a secondary synchronization signal (SSS) transmitted from a base station, comprising:
means for obtaining samples of a received signal across one or more reference pilot intervals;
means for processing the samples to detect a plurality of SSS candidates, each SSS candidate having a corresponding first short code and second short code and the processing comprising computing a combined energy metric for each SSS candidate based on the first and second short codes;
means for computing, for each SSS candidate, a first energy metric for the first short code and a second energy metric for the second short code; and
means for generating channel estimates for at least one of the first short code or the second short code; and
means for using the channel estimates to perform interference cancellation for the first and second short codes.

23. The apparatus of claim 22, wherein:
the channel estimate for the first short code is used to perform interference cancellation of the first short code; and
the channel estimate for the second short code is used to perform interference cancellation of second short code.

24. The apparatus of claim 22, wherein the channel estimate for the second short code is used to perform interference cancellation of both the first short code and the second short code.

25. A non-transitory computer-readable medium for detecting a secondary synchronization signal (SSS) transmitted from a base station having instructions stored thereon, the instructions executable by one or more processors for:
obtaining samples of a received signal across one or more reference pilot intervals;
processing the samples to detect a plurality of SSS candidates, each SSS candidate having a corresponding first short code and second short code and the processing comprising computing a combined energy metric for each SSS candidate based on the first and second short codes;
computing, for each SSS candidate, a first energy metric for the first short code and a second energy metric for the second short code; and
selecting one of the SSS candidates based on evaluation of the corresponding first and second energy metrics, wherein the selecting comprises identifying SSS candidates that share a first short code or second short code with another SSS candidate and eliminating identified SSS candidates based on evaluation of the corresponding first and second energy metrics.

26. A non-transitory computer-readable medium for detecting a secondary synchronization signal (SSS) transmitted from a base station having instructions stored thereon, the instructions executable by one or more processors for:
obtaining samples of a received signal across one or more reference pilot intervals;
processing the samples to detect a plurality of SSS candidates, each SSS candidate having a corresponding first short code and second short code and the processing comprising computing a combined energy metric for each SSS candidate based on the first and second short codes;
generating channel estimates for at least one of the first short code or the second short code; and
using the channel estimates to perform interference cancellation for the first and second short codes.

* * * * *